April 3, 1934.  H. E. CURTIS  1,953,749
AUTOMOTIVE VEHICLE
Filed Oct. 1, 1932  3 Sheets-Sheet 1
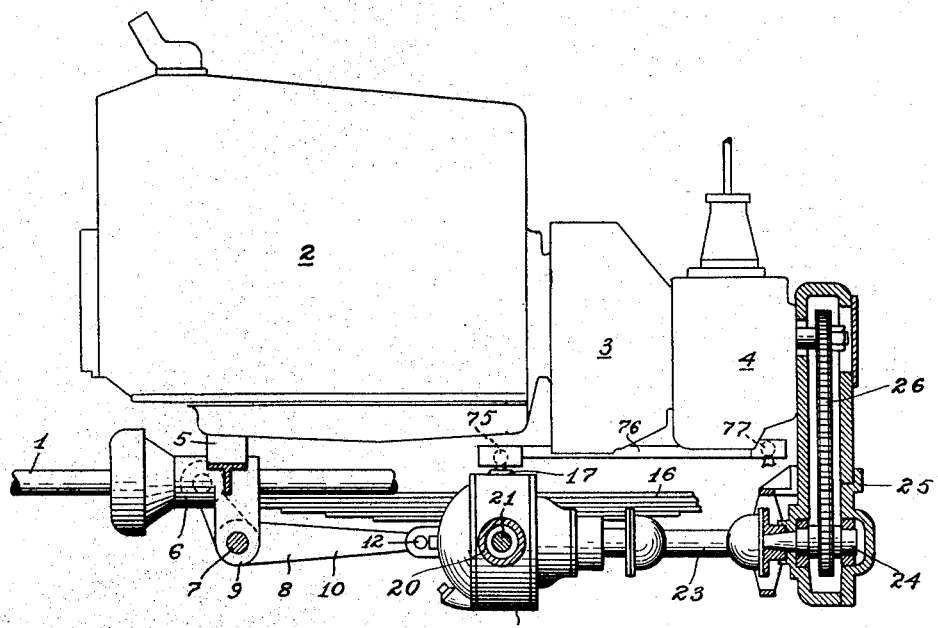
Fig-1-
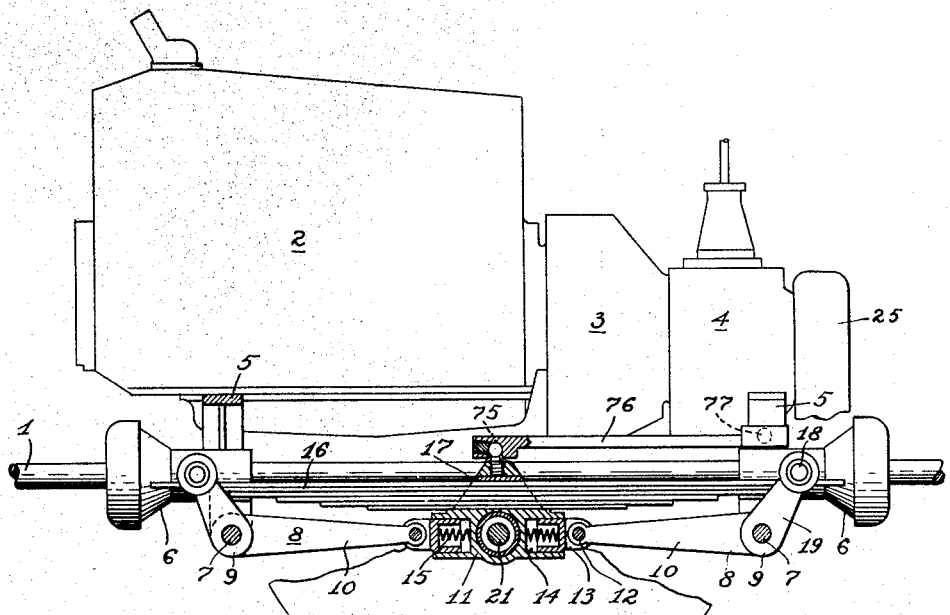
Fig-2-

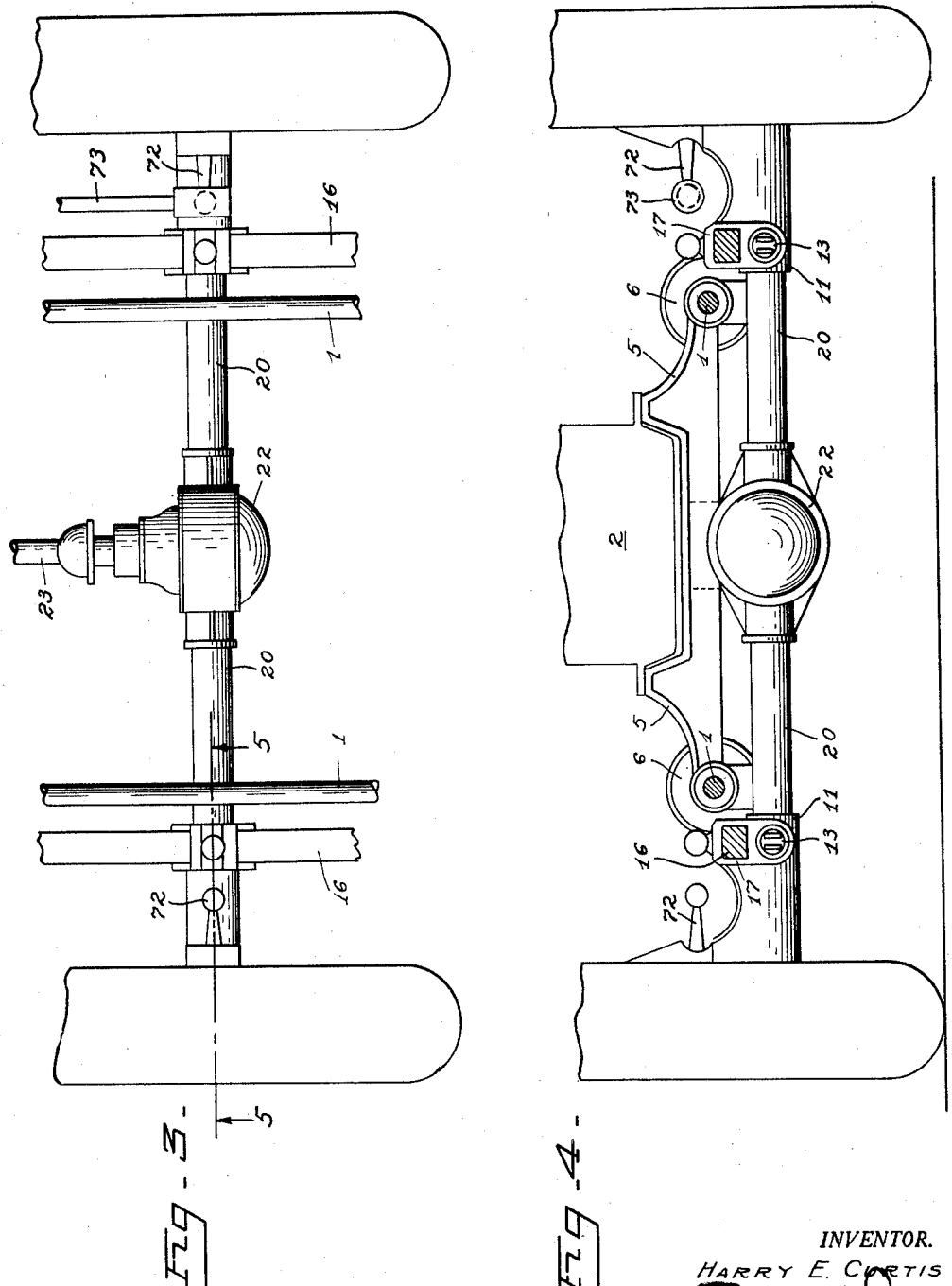

April 3, 1934. H. E. CURTIS 1,953,749
AUTOMOTIVE VEHICLE
Filed Oct. 1, 1932 3 Sheets-Sheet 3

INVENTOR.
HARRY E CURTIS.
BY
ATTORNEYS.

Patented Apr. 3, 1934

1,953,749

UNITED STATES PATENT OFFICE 1,953,749

AUTOMOTIVE VEHICLE

Harry E. Curtis, San Jose, Calif., assignor to Bill Motors Company, Oakland, Calif., a corporation of California Application October 1, 1932, Serial No. 635,731

8 Claims. (Cl. 180—42)

This invention relates particularly to a construction of an automotive vehicle wherein each of the road wheels of the vehicle is provided with an improved spring suspension, in which road shocks are transmitted from each road wheel through its own independent spring suspension to the vehicle frame, so that the tendency of a shock which may have been encountered by any one of the vehicle wheels, is neutralized and absorbed by the spring suspension, and hence the transmission of road shocks to the frame, or through the frame from any one wheel to another, is eliminated.

A further object of the invention is to provide in an automotive vehicle construction, a road wheel wherein the driving power is applied to said wheel in line with the vertical axis of the wheel; wherein the wheel driving mechanism is in alignment with the transverse vertical center of the vehicle wheel, and wherein the horizontal axis of the wheel about which the said wheel rotates, is arranged exactly half-way between the journals for supporting the wheel in movements about its vertical axis.

A still further object of the invention is to provide a power driven wheel construction in which the said wheel is adapted to be rotated on a horizontal axis, and to be turned on a vertical axis, said horizontal and vertical axes intersecting each other at a point approximating the center of mass and of balance of the wheel, whereby the loads carried and forces encountered by the wheel are equably transmitted to either the vertical or horizontal axis of the wheel.

A still further object of the invention is to provide an automotive vehicle construction having driven traction wheels, each of which are driven by a common drive shaft, and each of said wheels being mounted on a vertical axis to be turned or moved thereby, for steering purposes, mechanism being provided to maintain the said vertical axis of the wheels in a true vertical position at all times, to prevent shimmying of the wheels, or tendency of the wheels to turn to one side or the other.

Other objects and advantages of the invention are to provide an automotive vehicle construction having a spring suspension mechanism connecting each of the traction wheels to the frame, each spring suspension mechanism being local to the wheel to which it is connected, to thereby localize tortional stresses, road shocks, and other disturbances, directly to the wheel and to the portion of the vehicle frame directly adjacent thereto, and to provide a combined wheel driving and steering mechanism arranged on one or more of the wheels, and yieldably supported with relation to the vehicle frame, by means which positions the vertically disposed spindles for steering the wheels of the vehicle in a substantially perpendicular position at all times without minimizing the relative yieldability between the wheel or wheels and the vehicle.

Other objects and advantages are to provide an automotive vehicle construction, that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying drawings:

Fig. 1 represents a side elevation of a power unit for an automotive vehicle arranged with a change speed mechanism thereon, suitably connected to a driving mechanism and to an axle mechanism constructed in accordance with my invention.

Fig. 2 is a view similar to Fig. 1, showing a portion of a frame of a vehicle on which the power unit is mounted, illustrating the method of spring connection between the frame and the wheel axles.

Fig. 3 is a plane view of a portion of a vehicle frame showing the driving axle having the combined driving and steering wheels thereon.

Fig. 4 is a front elevation of Fig. 3.

Figure 5:
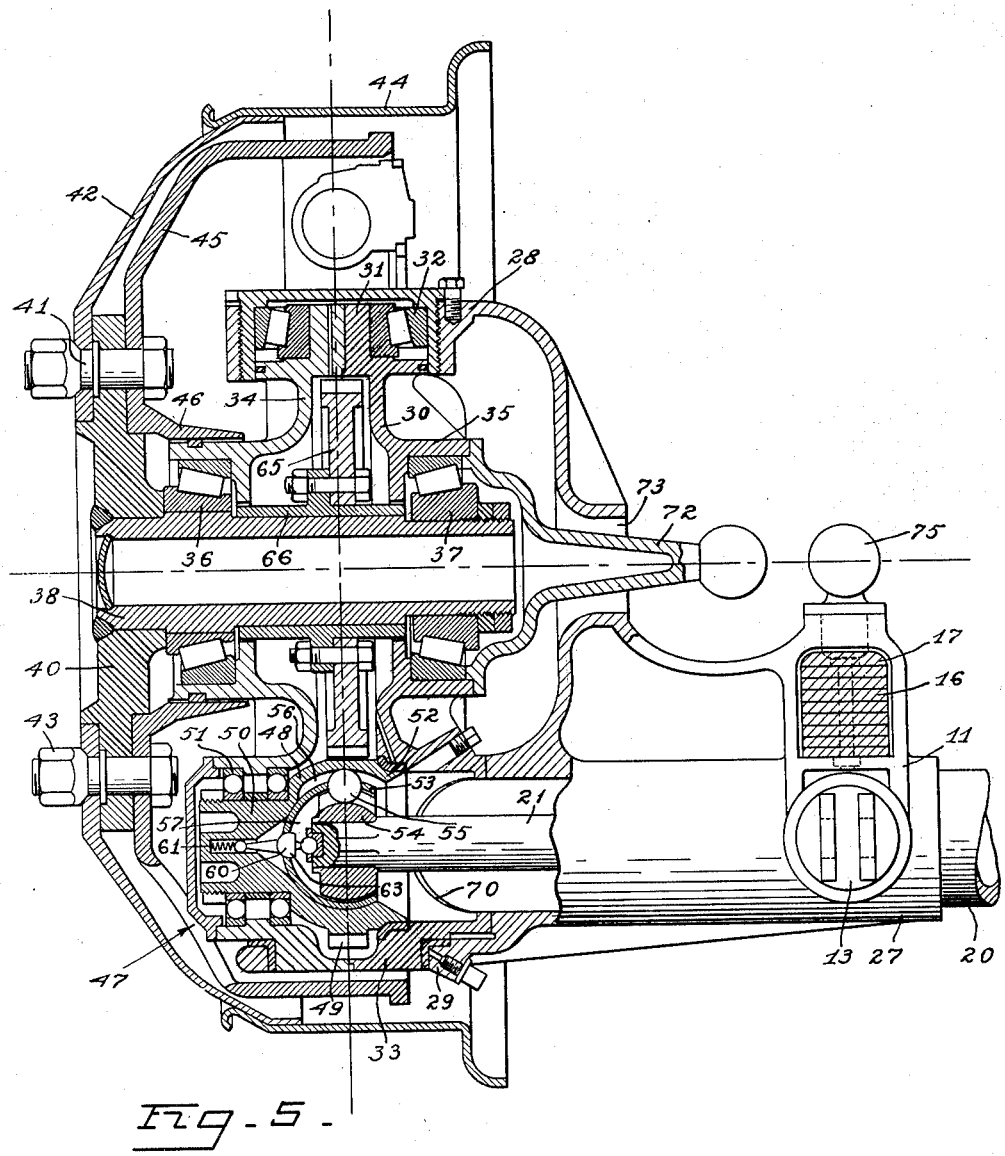
Fig. 5 is a vertical cross section in enlarged scale, taken through Fig. 3 on the line 5—5.

In the accompanying drawings the numeral 1 indicates the frame of an automotive vehicle, which frame consists of parallel members arranged to extend lengthwise of the vehicle and on which the vehicle power unit, the body, axles, springs and wheels, are mounted. The parallel members comprising the frame 1 are suitably trussed and supported throughout their entire length in accordance with conventional practice. The vehicle to be hereinafter described is designed primarily to accommodate a front wheel drive and steering assembly, altho it would be clearly within the purview of the invention to incorporate the same into a rear wheel drive assembly.

The vehicle engine 2, flywheel housing 3, and transmission 4 is joined together as a unit, and said unit, at its forward and rearward ends, is provided with brackets 5, which extend laterally outward on both sides thereof and are secured to sleeves 6 which are mounted on the parallel frame members 1. The sleeves 6 have a noise deadening and shock absorbing material, such as rubber, interposed between the sleeves and the frame, whereby vibrations of the motor assembly are prevented from being transmitted to the frame and thence to the body of the vehicle. The rearward sleeves 6 on each of the opposite sides of the engine assembly are connected together by transverse tie rods 7, for the purpose of holding said sleeves in a predetermined spaced relation on the frame members 1.

In accordance with conventional automotive construction the vehicle is provided with four or more road wheels, and in this particular instance, the forward traction wheels are power driven wheels, while the rear traction wheels are not driven. Each road wheel is arranged below the frame 1 of the vehicle and is suitably connected thereto by a combined spring and mechanical equalizing mechanism, whereby each road wheel will effectively dissipate any and all road shocks, as well as neutralize load conditions imparted thereto from the vehicle, without in any wise transmitting said conditions to the vehicle body, or to any of the other yieldable mountings supporting the other wheels. The spring mounting for the forward driving wheels is substantially the same as the spring construction for the rear wheels, and spring mountings for each of the wheels, at corresponding points on opposite sides of the vehicle, is the same. Each wheel spring mounting consists of a bell crank 8 fulcrumed at its elbow 9 on an end of each one of the transverse tie rods 7, which have heretofore been described as being a part of the sleeves which support the motor mounting.

The longer arm 10 of the bell crank is adapted to lie substantially parallel to the longitudinal frame members 1, there being a pair of said bell cranks spaced equidistantly on opposite sides of the vehicle axis of the road wheel, to be hereinafter described.

A leaf spring support 11 is interposed between the free ends of each of the arms 10 of the opposed bell cranks. The free end of each of the longer arms 10 of the respective bell cranks is pivotally connected at 12, to a piston or plunger 13 which is slidably confined in a guideway 14, formed respectively on the front and rear sides of the spring support 11. An expansion spring 15 is interposed between each plunger 13 and the spring mounting, to permit a limited reciprocative movement between the respective bell cranks and the spring support 11. A leaf spring 16 has its center portion mounted in a saddle 17 on the upper side of the spring support 11, and each of the opposite ends of said leaf spring are confined between or beneath horizontally projecting abutments 18 provided on the free ends of each of the shorter arms 19 of the bell cranks 8.

An axle housing 20 is arranged transversely beneath the frame 1 and power unit, and the opposite ends of said housing 20 are secured in the opposite spring supports 11. The axle housing 20 is substantially conventional in its construction and design, having at its center portion an enlarged housing 22, within which a standard type of differential is mounted. From the differential within the axle housing, driving axles 21 extend in both directions to the opposite road wheels to be driven. The gearing in the differential is driven by a shaft 23 suitably provided with universal joints and couplings, to a shaft 24 which is rotatably journaled in the lower end of a housing 25 connected to the rear end of the transmission 4. The shaft from the transmission 4 extends into the housing 25 and is connected by a chain or gear drive 26 to the shaft 24. Power from the engine is thus transmitted from the transmission through the chain drive to the shaft 23, which in turn drives the differential mechanism in the axle housing, which, in turn, rotates the respective drive axles 21, as will be hereinafter explained.

Each of the opposite ends of the axle housing 20 are securely mounted within a cylindrical portion 27 provided on the spring support 11. The spring support on its outer side is provided with a pair of spaced extensions in the form of bearing supports 28 and 29, the axes of which are in vertical alignment. A shaft housing 30 has its upper end 31 supported in an anti-friction bearing 32, which is confined in the upper bearing support 28, while the lower end 33 of the housing 30 is journaled in the lower bearing support 29. The shaft housing 30 is mounted in the bearing supports 28 and 29 so that it is maintained on a true perpendicular at all times.

The shaft housing 30 is formed of two halves or plates 34 and 35, both of which are joined together on a plane, the meeting edge of which aligns with the vertical axis of the bearing supports 28 and 29. The outboard half 34 of the shaft housing 30 is provided with an anti-friction bearing 36 therein, and the inboard 35 of said housing is provided with an anti-friction bearing 37 therein, said bearings 36 and 37 have their axes in true horizontal alignment. A hollow shaft 38 is supported at its opposite ends in the respective bearings 36 and 37 and the axis of said shaft 38 intersects the vertical axis of the bearing supports 28 and 29 at right angles thereto. The outer circumference of the shaft 38 is suitably shouldered and threaded so that it may be placed in a predetermined position within the bearings 36 and 37 and locked thereagainst to avoid any end play or axial movement thereof. The extreme end of the shaft 38 is provided with a disc or flange 40 which is welded or otherwise frictionally secured thereto, and the outer circumference of said plate 40 is provided with a series of spaced circumferential bolts 41. A tire supporting wheel 42 is adapted to be arranged over the face of the flange or disc 40 and to be mounted on the bolts 41, the usual hub nuts 43 being provided to hold the wheel on the flange. The wheel 42 is dished or shaped to extend over and partially enclose the bearing supports 28 and 29, as well as the shaft housing 30. A tire rim 44 is securely fixed to the circumferential edge of the wheel 42 and said rim 44 serves to fully enclose the steering and driving mechanism mounted on the end of the spring support 11.

A drum 45 is attached to the inner side of the disc or flange 40 and a brake mechanism of conventional character is adapted to cooperate with the inner circumference of the flange 45 to apply braking effort for retarding rotation of the wheel. A sleeve 46 is provided on the drum 45 to overlie and enclose a portion of the housing cover 34, to prevent oil or lubricant, around the shaft 38 and bearings 36 and 37, from escaping and for also preventing dirt and other foreign substances from working into the shaft bearings.

The lower end of the split housing 30 is provided with a horizontally disposed bearing support 47, the same being positioned directly above the lower vertical bearing support 29. The horizontal bearing support 47 is formed in both of the lower halves 34 and 35 of the housing 30. A hemispherical universal joint is supported at its opposite ends in the bearing 47, said universal joint consisting of an outer portion or casing 48, which is substantially hemispherical in contour, and has a gear 49 formed around its outer circumference. The casing 48 on one side thereof is provided with a projecting shaft portion 50 which is supported in anti-friction bearings 51 formed in the bearing support 47, while the opposite side 52 of the casing 48 is journaled in the bearing support 47. The interior of the casing 48 is hollowed out to form a ball seat for the hemispherical shell 53, which, said shell, has a segment of its circumference cut away to leave a substantially flat side thereon. An end of the driving axle 21 extends within the shell 53 and the end of said shaft is provided with a spherical enlargement 54 on the end thereof which is confined within the shell 53. One or more of a series of driving balls 55 are mounted within the shell 53 to project on opposite sides of said shell, and the projecting portions of the balls are confined within slots or guideways 56 and 57 formed respectively, in the casing 48 and the projections 54 on the end of the drive shaft 21. The bottoms of the grooves 56 and 57 have the same spherical contour as that of the shell 53 whereby the driving balls are free to move throughout the length of the grooves to accommodate themselves to any oscillatory movement of the shell 53. The extreme end of the drive shaft 21, in axial alignment therewith, is provided with an attenuated shaft 60 thereon, one end of said shaft having a ball seat which is confined in the end of the shaft 21, while the opposite end of the shaft 60 is provided with a ball seat confined against a compression spring 61 which is seated in a concavity formed in the casing 48. The shaft 60 is provided with a hemispherical seat 62 therein at the point where said shaft extends through the shell 53, and said shaft 60 exerts an end thrust against the drive shaft 21 sufficient to maintain all parts of the driving universal joint in proper relation to the end of the drive shaft and the driving teeth 49 on the exterior of the casing 48.

Driving power from the shaft 21 is transmitted through the driving balls 55 to the casing 48 and thence to the gear teeth 49 therearound. In view of the fact that the casing 48 is drivingly mounted in the housing 30, which in turn is supported on the spring support 11, so that it may be moved about a vertical axis, it is obvious that the universal driving connection between the shaft 21 and the casing 48 will function at all times and irrespective of any turned position which the housing 30 may assume about its vertical axis.

A gear 65 is attached to a sleeve 66 around the outside of the shaft 38 within the housing 30, and the teeth of said gear mesh with the gear teeth 49 on the casing 48. Driving power from the shaft 21 which is transmitted through the universal, serves to rotate the gear 65, shaft 38, flange 40 and the wheel 42.

The cover 35 of the housing 30 at the point indicated by the numeral 70, is faced off on the outside with a spherical curvature so as to have a spherical seat against a portion of the spring support casting 11. The housing 30 being supported at its upper and lower ends in the bearings 28 and 29 can be moved about a vertical axis, and this movement requires the curved seat 70 between the housing 30 and the support 11, which seat prevents leakage of lubricant and the ingress of deleterious substances.

The housing 30 on the inboard side thereof, in axial alignment with the shaft 38, is provided with a projection forming a steering knuckle 72, which steering knuckle extends out through a slot 73 formed in the inner side of the spring support 11. The steering knuckle 72 is thus arranged substantially midway between the ends of the vertical bearing supports 28 and 29, and is a substantial distance out from the vertical axis of said housing, whereby sufficient leverage is attainable with which to freely and easily swing the housing 30 on its vertical pivots. The steering knuckle 72 is connected by a link 73 to the conventional steering gear mechanism on the vehicle.

In order to maintain the spring support 11, as well as the bearing supports 28 and 29 about which the wheel moves, on a vertical axis, in a true perpendicular at all times, I have provided a fixed spherical projection 75 on the upper side of the spring support 11, which spherical support 75 lies in horizontal alignment with the horizontal axis of the steering knuckle 72, and in parallel alignment with the vertical axis of the wheel. The spherical support 75 is pivotally connected by a link bar 76 to a spherical seat 77 arranged on the vehicle frame. The bar 76 being pivotally connected to the spring support 11 on the upper side thereof, in conjunction with the arms of the bell crank which are related to the under side of the spring support 11, serves to hold the said spring support 11 on true horizontal and vertical planes at all times. The mechanism for holding the spring support in relation to the vehicle frame, permits the central axis of said support to have a free movement on a vertical plane at all times and within certain limits to have a relatively free movement on a horizontal plane. Thus road shocks and other disturbances encountered by the traction wheels, can be effectively dissipated, and the wheels of the vehicle can be positively driven and freely steered. It will be noted that the axis of the wheel shaft 38, and the axis of the steering knuckle 72, and the axis of the spherical support 75, all lie in true horizontal alignment, and in addition, the axes of said parts intersect the vertical axis about which the wheel is turned at right angles thereto. By thus aligning the axes of all of said parts, all stresses and strains, as well as shocks or other forces directed to or encountered by the wheel, are localized to the same vertical or horizontal axis in contra-distinction to other forms of wheel steering and driving mechanisms wherein the parts are arranged on different parallel vertical axes and different parallel horizontal axes. With my construction shimmying of the wheel is entirely eliminated as well as the tendency of the wheels to refuse "to track" in a predetermined direction.

In practically all assemblies of power driven steering wheels, the arrangement and construction is such that the wheels will tend to turn either to one side or the other from the straight ahead direction, and as a result the vehicle is hard to steer and manage.

The shaft housing 30 as heretofore described has its upper and lower ends pivotally journaled in the bearings 28 and 29 respectively, and in effect said housing 30 functions in the same manner as the usual steering spindle of the conventional steering wheel assembly. The length of the steering knuckle 72 which is connected to the spindle housing 30, is ample for turning the said housing on its vertical axis and the construction and design of the mechanism has been so balanced and proportioned that the parts are fully capable of sustaining extreme high pressures and forces without in anywise effecting the efficient operation thereof. The equalizing bar 76 which is connected to the spring support 11 in combination with the bell cranks, serves to maintain the spindle housing 30 in a true perpendicular position at all times, and eliminates the possibility of any torque or other reaction tending to turn the spring support into a position where it would interfere with the steering of the wheels. It is to be noted that the entire body of the leaf spring 16, as well as the bell cranks 8, lie below the axis of the wheel shaft 38 and wheel 42. The weight of the vehicle is thus entirely supported beneath the axis of the wheel whereby greater efficiency in the braking operation of the wheels is obtainable. Where the weight of the vehicle is supported above the axis of rotation of the traction wheels, and braking power is applied to said wheels to retard rotation thereof, the momentum of the weight of the vehicle tends to cause the wheels to continue to rotate in a direction in line with the movement of the vehicle. I have found that by applying the weight of the vehicle below the axis of the wheels, that when the brakes are applied to the road wheels, the momentum of the weight of the vehicle tends to oppose forward rotation of the wheels, thus resulting in a much more efficient application of the braking power to the wheels.

The spring and mechanical equalizing mechanism which connects the opposite ends of the axle housing to the frame is individual to each wheel, whereby each wheel mounting may have a period of vibration different from the other wheel mountings, thereby eliminating the transmission of road shocks, etc., through the vehicle frame from one wheel mounting to another. The method of supporting the free ends of the bell cranks in the spring support, provides a torque equalizing and absorbing means which I have found to be very effective.

The springs 15 between the spring support and the opposed bell cranks, serve to hold the said spring support in a balanced position between the bell cranks and hence any torque tending to turn or twist the spring support about a horizontal axis would be absorbed and neutralized by the springs 15. All motive power from the engine 2 is transmitted to the axles 21 and thence to the wheels 42. The driving torque from the engine to the axles 21 is substantially constant, but due to the inertia of parts and the driving stresses imposed on the axle 21, as well as road shocks, excess loads, and other causes, frequently set up, for either short or prolonged periods of time, an excess torque which must be neutralized or absorbed. Any excess torque applied to the driving system tends to turn the spring support 11 about a horizontal axis, but this turning movement is restrained by the springs 15 reacting in conjunction with the bell cranks 8. The springs 15 automatically absorb the excess torque without interfering with the steady operation of the parts, thus permitting a constant driving ratio between the engine and the axles 21, irrespective of the torque conditions encountered thereby.

Having thus described this invention, what I claim and desire to secure by Letters Patent is:

1. An automotive vehicle construction including, a motor and a motor mounting; a pair of levers pivoted on each of the opposite sides of the motor mounting; a traction wheel on each of the opposite sides of the motor; an axle housing with aligned axles therein drivingly connected to each of said traction wheels; a support for each of the opposite ends of the axle housing connected between related ends of each pair of levers on opposite sides of the motor mounting; a leaf spring on each of the opposite sides of the motor mounting having the center portions thereof mounted on each axle support and having the opposite ends thereof related to the other ends of each pair of levers to maintain the motor mounting in yieldable relation with the opposite traction wheels; and power transmitting means between the motor and the respective wheel axles.

2. A road vehicle comprising a body frame, an engine mounted on said frame; driven mechanism connected to and operated by said engine; a driven shaft arranged transversely of the engine, an intermediate portion of said shaft being connected to the driven mechanism; and a mounting for said driven shaft on each of the opposite sides of the frame, comprising means directly pivoted to the frame on one side of each shaft mounting and pivoted to the related shaft mounting so that said shaft may swing about the pivot of said means; a second means directly pivoted to said frame on the other side of each shaft mounting and pivoted to the said shaft mounting so that said shaft may swing about the pivot of said second means; and mechanism interconnecting both of said means to the respective shaft mountings.

3. A road vehicle comprising a body frame, an engine mounted on said frame; driven mechanism connected to and operated by said engine; a driven shaft arranged transversely of the frame, an intermediate portion of said shaft being connected to the driven mechanism; a road wheel on each of the opposite sides of the frame drivingly connected to each opposite end of the driven shaft; a mounting to rotatably support each wheel and carrying said driven shaft therein; a steering spindle enclosing the wheel driving mechanism arranged in each mounting so that each mounting may swing on a vertical axis; and a spring mechanism connecting each axle mounting to the frame.

4. A road vehicle comprising a body frame, an engine mounted on said frame; driven mechanism connected to and operated by said engine; a driven shaft arranged transversely of the frame, an intermediate portion of said shaft being connected to the driven mechanism; a wheel axle drivingly connected to each opposite end of said driven shaft, each wheel being drivingly connected by a universal joint to an end of the driven shaft; and a mounting for each wheel axle on each of the opposite sides of the frame being pivoted thereto on a vertical axis to form a steering spindle; and means directly pivoted to the frame on one side of each axle and pivoted to the related axle mounting so that said axle may swing in a vertical plane about the pivot of said means; a second means directly pivoted to said frame on the other side of each axle and pivoted to the said axle mounting so that said axle may swing in a vertical plane about the pivot of said second means; and mechanism interconnecting both of said means to the respective axle mountings.

5. A road wheel mounting for an automotive vehicle including, a housing supported in a fixed position on the vehicle; a casing journaled in a vertical position in said housing; a shaft journaled in a horizontal position in said casing; a road wheel related to said shaft; a gear on said shaft in said casing; a universal driving gear journaled in said casing; a driving shaft journaled in said housing, having an end thereof drivingly connected with said universal driving gear; and a steering bar mounted on said housing to move the same about its vertical axis.

6. A road wheel mounting for an automotive vehicle including, a support; a casing journaled in a fixed position on the support; a horizontally disposed shaft having its opposite ends journaled in said casing on opposite sides of the vertical axis of said casing; a road wheel related to said shaft; a gear on said shaft; a driving pinion journaled in said casing in meshing engagement with said gear; a drive shaft; and a universal joint drivingly connected to said driving pinion and driving shaft, whereby said casing may be moved about its vertical axis without interfering with the application of driving power from the driving shaft to the road wheel.

7. A road wheel mounting for an automotive vehicle including, a forked housing supported in a fixed position on the vehicle, the fork of said housing being disposed in a vertical plane having vertically aligned journals formed therein; a cylindrical casing having bearings on diametrically opposite sides thereof mounted in the forked journals; a shaft journaled in a horizontal position in said casing in concentric relation therewith; a road wheel related to said shaft; a gear on said shaft within said casing; a hollow driving pinion journaled in said casing in meshing engagement with said gear; a universal joint in said hollow driving pinion; and a driving shaft journaled in said housing having an end thereof drivingly connected with said universal joint.

8. A road wheel mounting for an automotive vehicle including, a housing having its major axis disposed on a horizontal plane; a forked frame on said housing and having vertically disposed journals arranged therein; a casing rotatably mounted in said journals; a horizontally disposed wheel axle journaled in said casing, the axis of said wheel axle being above and parallel to the axis of the housing; a wheel drivingly connected to said axle; a gear train in said casing to rotate said wheel axle; a driving shaft journaled in said housing; and a universal joint interposed between said driving shaft and gear train, whereby the housing supports the road wheel in a driving and steering position at a point below the axis of rotation of the road wheel.

HARRY E. CURTIS.